US008266592B2

(12) United States Patent
Beto et al.

(10) Patent No.: US 8,266,592 B2
(45) Date of Patent: Sep. 11, 2012

(54) RANKING AND OPTIMIZING AUTOMATED TEST SCRIPTS

(75) Inventors: Kevin Rocco Beto, Kirkland, WA (US); Che Yan Timothy Wong, Issaquah, WA (US); Ricky Kurniawan, Edmonds, WA (US)

(73) Assignee: Microsoft Corporation, Redmond, WA (US)

( * ) Notice: Subject to any disclaimer, the term of this patent is extended or adjusted under 35 U.S.C. 154(b) by 1176 days.

(21) Appl. No.: 12/107,055

(22) Filed: Apr. 21, 2008

(65) Prior Publication Data
US 2009/0265681 A1    Oct. 22, 2009

(51) Int. Cl.
*G06F 9/45* (2006.01)
(52) U.S. Cl. .................. 717/124; 717/127; 717/135
(58) Field of Classification Search .................. 717/124
See application file for complete search history.

(56) References Cited

U.S. PATENT DOCUMENTS

| | | | |
|---|---|---|---|
| 5,754,760 A * | 5/1998 | Warfield | 714/38.1 |
| 6,748,304 B2 * | 6/2004 | Felke et al. | 701/29 |
| 7,020,797 B2 | 3/2006 | Patil | |
| 7,093,238 B2 | 8/2006 | Givoni et al. | |
| 7,149,928 B2 | 12/2006 | van Os | |
| 7,191,326 B2 * | 3/2007 | Louden et al. | 713/1 |
| 7,373,290 B2 * | 5/2008 | Gabele et al. | 703/21 |
| 2004/0073890 A1 * | 4/2004 | Johnson et al. | 717/124 |
| 2005/0198622 A1 * | 9/2005 | Ahluwalia et al. | 717/130 |
| 2005/0261859 A1 * | 11/2005 | Petsinger | 702/120 |
| 2005/0278577 A1 * | 12/2005 | Doong et al. | 714/38 |
| 2006/0070035 A1 | 3/2006 | Ulrich et al. | |
| 2006/0075305 A1 | 4/2006 | Robinson et al. | |
| 2006/0184918 A1 * | 8/2006 | Rosaria et al. | 717/124 |
| 2006/0271830 A1 | 11/2006 | Kwong et al. | |
| 2007/0061626 A1 * | 3/2007 | Nelson et al. | 714/38 |
| 2007/0094189 A1 * | 4/2007 | Yamamoto et al. | 706/45 |
| 2007/0168734 A1 | 7/2007 | Vasile | |
| 2007/0168970 A1 | 7/2007 | Li et al. | |
| 2007/0234293 A1 | 10/2007 | Noller et al. | |
| 2008/0115110 A1 * | 5/2008 | Fliek et al. | 717/125 |
| 2008/0320462 A1 * | 12/2008 | Bergman et al. | 717/168 |

OTHER PUBLICATIONS

Wei-Tek Tsai, Yinong Chen, Raymond Paul, Hai Huang, Xinyu Zhou, and Xiao Wei. 2005. Adaptive Testing, Oracle Generation, and Test Case Ranking for Web Services. In Proceedings of the 29th Annual International Computer Software and Applications Conference—vol. 01 (COMPSAC '05), vol. 1. IEEE Computer Society, Washington, DC, USA, 101-106.*

Zheng Li, Mark Harman, and Robert M. Hierons. 2007. Search Algorithms for Regression Test Case Prioritization. IEEE Trans. Softw. Eng. 33, 4 (Apr. 2007), 225-237.*

(Continued)

*Primary Examiner* — Wei Zhen
*Assistant Examiner* — Matthew Brophy
(74) *Attorney, Agent, or Firm* — Hope Baldauff Hartman, LLC

(57) ABSTRACT

Technologies are described herein for ranking and optimizing test scripts utilized in the automated testing of software products. A score is calculated for each test script from various metrics collected from executions of the test script. Metrics utilized in calculating the score for a test script may include those indicating the propensity of the script to result in "false failures" and/or those indicating the effectiveness of the script for finding product bugs. The test scripts are then ranked by their score, and this ranking is used in determining the frequency of execution of the test script in future testing.

11 Claims, 3 Drawing Sheets

OTHER PUBLICATIONS

Nagappan, et al., "Providing Test Quality Feedback Using Static Source Code and Automatic Test Suite Metrics", Proceedings of the 16th IEEE International Symposium on Software Reliability Engineering (ISSRE'05), IEEE Coputer Society, IEEE, 2005, pp. 10.

Podgurski, et al., "Automated Support for Classifying Software Failure Reports", Proceedings of the 25th International Conference on Software Engineering (ICSE'03), IEEE Computer Society, IEEE, 2003, pp. 11.

Ciupa, et al., "Automatic Testing Based on Design by Contract", In Proceedings of Net.ObjectDays 2005 (6th Annual International Conference on Object-Oriented and Internet-based Technologies, Concepts, and Applications for a Networked World, 2005, pp. 13.

Hangal, et al., "Tracking down Software Bugs Using Automatic Anomaly Detection", Proceedings of the 24th International Conference on Software Engineering, ACM, 2002, pp. 11.

* cited by examiner

RANKING AND OPTIMIZING AUTOMATED TEST SCRIPTS

BACKGROUND

Formal testing of software is necessary not only to ensure the quality of a software product but to verify that the various components or modules of the software meet their design requirements and integrate together correctly to produce the desired effect. Formal testing may include the design, development, and execution of a variety of test cases. Each test case generally targets a specific element of functionality or individual interface of a software module, and includes a number of test conditions, a test script to be executed to test the conditions, and the expected results for each major step in the script. The test script can be executed manually or by automated testing tools. The use of automated testing, while often requiring more upfront effort, provides for more complete testing of software modules as well as more efficient regression testing of the software as changes to the modules are implemented. In addition, automated testing allows for testing metrics to be automatically collected for each execution of a test script, such as the date when executed, the execution time, and the result (pass or fail).

The various test scripts utilized in automated testing may further be collected into test suites. For example, one test suite may be created to include all test scripts for a specific software module, and another created for a particular element of functionality across all modules. Test suites may also be created to include test scripts based on the time of execution and the functionality tested. For example, one test suite may include test scripts that test the critical functions of a software product in the least amount of time, while another includes test scripts that test a broader range of functions but require more time to complete. Accordingly, the various test suites will be executed with different levels of frequency, depending upon the amount of time available for testing and the required scope of coverage.

Some test scripts may be prone to producing "false failures." False failures are failures not due to a product bug but due to external factors. For example, the execution of a test script may result in a failure due to locks placed on resources by other test scripts being executed simultaneously, timing issues in user interface elements due to the speed of the automated testing software, or unavailability of external resources, such as a networked resource. Other test scripts may not be effective at identifying product bugs because they are subject to random failures or intermittent race conditions. In addition, as individual software modules and components are changed over time, individual test scripts may be rendered less effective, for example, by requiring an inordinate amount of time to test an element of functionality or interface that is no longer critical to the software product. Because of the number of scripts that may be utilized in the testing of a software product, it can be difficult to identify the test scripts that are prone to producing false failures or those that have become less effective in identifying product bugs.

It is with respect to these considerations and others that the disclosure made herein is presented.

SUMMARY

Technologies are described herein for ranking and optimizing test scripts utilized in the automated testing of software products. In particular, individual test scripts are ranked based on a score calculated from metrics collected from the execution of the test script. This ranking is used in determining the frequency of execution of the test script in future testing.

According to aspects presented herein, test scripts are grouped in collections, or test suites, which determine the frequency of their execution. The various suites of test scripts are executed and a test result and other execution data for each of the test scripts are recorded in a testing repository. A score is then calculated for each test script based upon the test results and execution data contained in the repository. This score is used to rank the test scripts, and the rank of each test script is used to determine the test suite to which the test script should be assigned. This method is repeated iteratively, with the test results and execution data for each execution of the test scripts being recorded in the repository.

According to one aspect of the disclosure, the test result recorded from each execution of a test script indicates success, failure due to a product bug, failure not due to a product bug, or failure requiring investigation. The test result values for the test scripts recorded in the repository for a particular time period are used to calculate a score indicating the propensity of each test script to result in "false failures," or failures not due to a product bug. A formula is used to calculate the score which includes the summation of several terms. Each term is multiplied by a weighting factor, and the sum is then multiplied by the number of executions of the test script within the time period. The weighting factors and time period can be adjusted to further optimize the score results. The test scripts are then ranked based upon this score, with the test scripts having the highest propensity to produce false failures ranked the highest. In one aspect, a number of the highest ranked test scripts are then re-assigned to test suites which are executed less frequently. In further aspects, a number of the highest ranked test scripts are slated for investigation or removed from testing altogether.

According to another aspect of the disclosure, the data recorded from each execution of a test script further includes the execution time of the script and the number of unique lines of code tested by the script. These values are used in conjunction with the test results recorded in the repository for a particular time period to calculate a score indicating the effectiveness of each test script for finding product bugs. A formula is used to calculate the score which includes the summation of several terms, each being multiplied by a weighting factor which can be adjusted to further optimize the score results. The test scripts are then ranked based upon this score, with the test scripts having the lowest effectiveness for finding products bugs ranked the highest. A number of the highest ranked test scripts are then re-assigned to test suites which are executed less frequently, or the test scripts are slated for investigation.

According to further aspects presented herein, the score of an individual test script may be calculated from a number of terms including a combination of those indicating the propensity of the script to result in false failures and those indicating the effectiveness of the script for finding product bugs. The assignment of test scripts to test suites may be accomplished programmatically, based upon comparing the scores of individual test scripts against a threshold score, or manually by a test reviewer reviewing a list of test scripts ranked by the calculated score. It should be appreciated that the above-described subject matter may be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
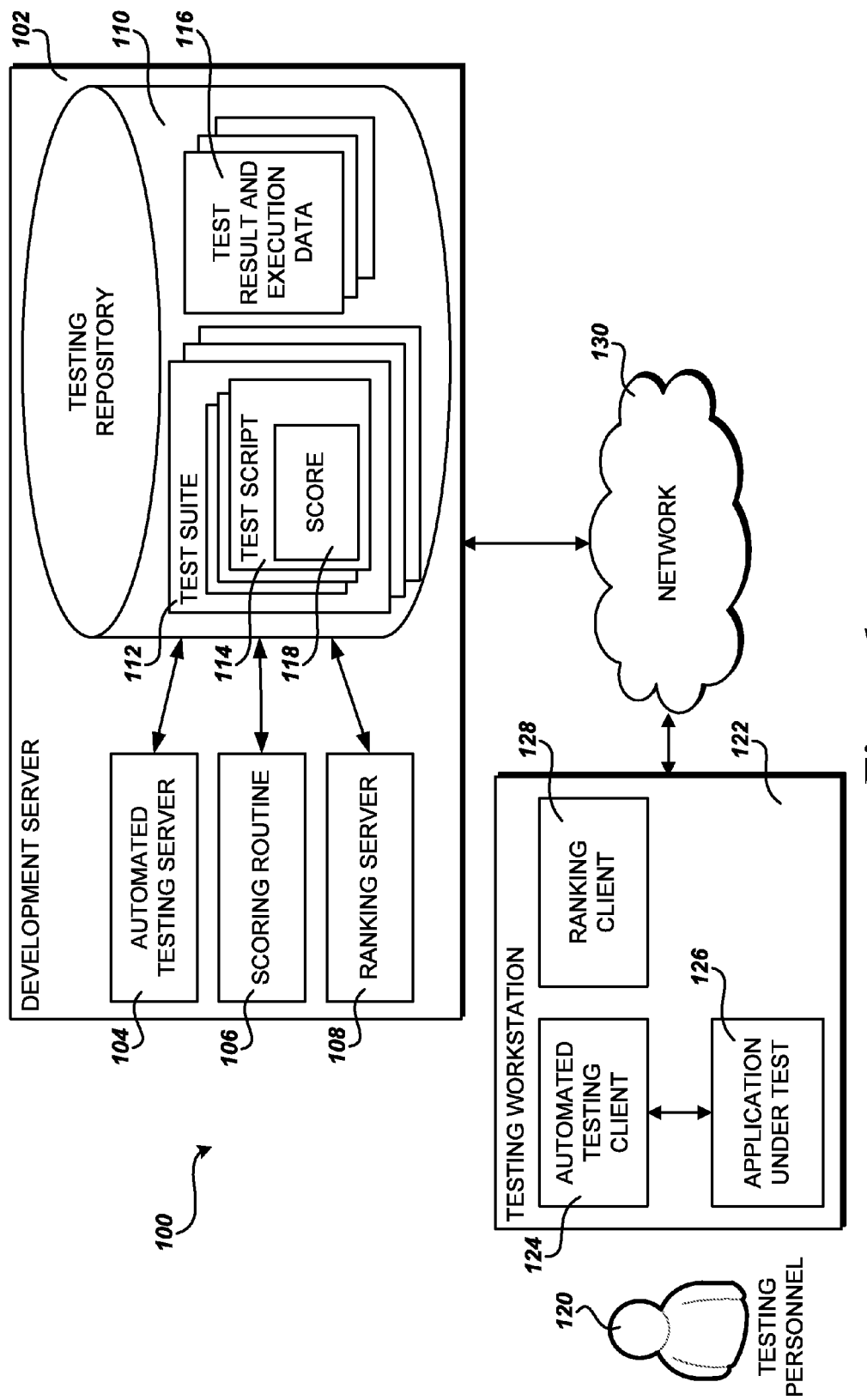
FIG. 1 is a block diagram showing aspects of an illustrative operating environment and several software components provided by the embodiments presented herein.

The following detailed description is directed to technologies for ranking and optimizing test scripts utilized in the automated testing of software products. Through the use of the technologies and concepts presented herein, the various test scripts utilized in testing a software product are assigned a score based upon metrics collected during the execution of the test script. This score may reflect the propensity of the test script to produce false failures, the effectiveness of the script in finding product bugs, some combination of the two, or some other measure of the reliability of the test script in testing the software product. Based upon this score, the test script may be moved from a test suite that is executed frequently to a test suite executed less frequently. Test scripts meeting some threshold score may be slated for investigation and re-development, or may be eliminated from the testing process altogether. In addition, test script scores may be used to prioritize the execution of the individual scripts contained within a test suite, ensuring that the most valuable or effective scripts are executed first.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which show by way of illustration specific embodiments or examples. Referring now to the drawings, in which like numerals represent like elements through the several figures, aspects of a methodology for ranking and optimizing automated test scripts will be described.

Turning now to FIG. 1, details will be provided regarding an illustrative operating environment and several software components provided by the embodiments presented herein. FIG. 1 illustrates an exemplary system 100 for the automated testing of software products, composed of a development server 102 and a testing workstation 122 operatively connected by a network 130. According to one embodiment, the network 130 comprises the Internet. However, it should be appreciated that the network 130 may comprise a LAN, WAN, or other type of network suitable for allowing applications executing on the testing workstation 122 to communicate with applications executing on the development server 102. It may be further appreciated that many more networks and network connections may be utilized than illustrated in FIG. 1.

The testing workstation 122 is utilized by testing personnel 120 to test the software product or application under test (AUT) 126. In order to test the AUT 126, the testing personnel 120 utilize an automated testing client 124 executing on the testing workstation 122. The automated testing client 124 is connected to an automated testing server 104 executing on the development server 102. The automated testing server 104 is further connected to a testing repository 110 which contains the test scripts 114 that will be utilized by the automated testing client 124 to test the AUT 126. As discussed above, the test scripts 114 in the test repository 110 are grouped into test suites 112 based on the length of time of their execution and the scope and criticality of the functionality tested. The test suite 112 serves as a unit of execution for the included test scripts 114.

The testing personnel 120 utilize the automated testing client 124 to select the test suite(s) 112 that are to be executed against the AUT 126. The execution of the test suite 112 may be immediately executed, or may be scheduled to run on a delayed or periodic schedule, depending on the testing requirements. As the individual test scripts 114 included in the test suite 112 are executed, the automated testing client 124, through the automated testing server 104, records the test result and other execution data 116 regarding the execution of the test script 114 in the testing repository 110. As will be discussed in more detail below in regard to FIG. 2, the test result may include success or failure of the test script 114 and the execution data may include the date the script executed, the duration of the execution, the number of code blocks or lines of code tested, etc. It will be appreciated by one of ordinary skill in the art that, for a software product consisting of numerous modules and having several versions or releases, the test repository 110 may contain hundreds or thousands of test scripts 114, with test results and execution data 116 for each script 114 spanning several months or years of execution.

In embodiments presented herein, the testing repository 110 maintains one or more scores 118 for each test script 114 contained therein. As will be discussed in greater detail below in regard to FIG. 2, these scores are calculated from the test result and execution data 116 recorded in the testing repository 110 for each execution of the test script 114, and represent the reliability of the test script 114 in testing the software product. In one embodiment, the scores 118 are calculated by a scoring routine 106 executing on the development server 102. The scoring routine 106 may calculate the score 118 for a test script 114 each time new test result and execution data 116 are recorded to the testing repository 110, or the scoring routine 106 may be run periodically to update the scores 118 for all test scripts 114 in the repository 110 from the latest test result and execution data 116 available.

The calculated scores 118 are utilized to rank and prioritize the various test scripts 114 for future execution, according to embodiments presented herein. In one embodiment, a ranking server 108 executing on the development server 102 retrieves a list of test scripts 114 and their respective scores 118 from the testing repository 110 and presents the list to testing personnel 120 through the ranking client 128 executing on the testing workstation 122.

The testing personnel 120 may specify parameters to direct which test scripts 114 should be included in the list and by which score 118 and in what order the test scripts 114 should be ranked in the list. As will be further discussed below in regard to FIG. 2, testing personnel 120 may then utilize the ranked listing of test scripts 114 to determine which test scripts 114 should be included in each test suite 112, based upon the frequency of execution of the test suite 112 and the relative value of the test script 114 to the testing process.

The testing personnel 120 may further utilize the ranked listing of test scripts 114 to indentify test scripts 114 requiring investigation to determine if the script should be re-developed or eliminated from the testing process. In addition, the ranked listing of test scripts 114 may be used to prioritize the execution order of the individual scripts 114 contained within a test suite 112, to ensure that the most valuable scripts are executed first within the testing cycle. In other embodiments, the ranking server 108 may programmatically determine which test scripts 114 should be included in each test suite 112, identify test scripts 114 requiring further investigation, and prioritize the execution order of the test scripts 114 within a test suite 112, based upon threshold score values and other parameters previously configured by testing personnel 120.

While the automated testing server 104, scoring routine 106, ranking server 108, and testing repository 110 discussed above are illustrated in FIG. 1 as executing on a single development server 102, it will be appreciated that these components may be distributed across a number of operatively connected servers or computing devices, as required by a particular implementation. Similarly, it will be appreciated that the automated testing client 124 and ranking client 128 may execute on a number of workstations or other computing devices connected to the network 130, beyond the single testing workstation 122 depicted in FIG. 1.

Figure 2:
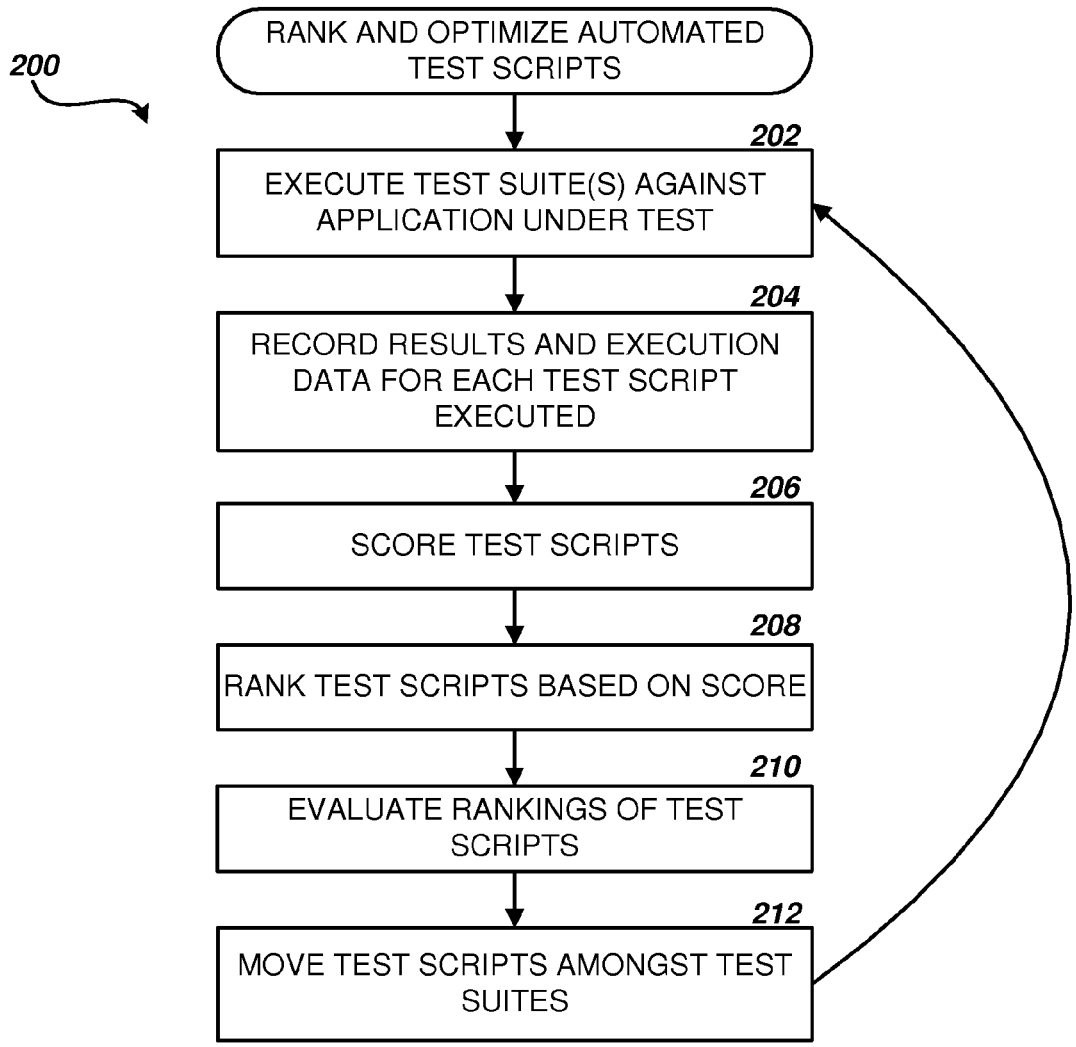
FIG. 2 is a flow diagram showing aspects of process for ranking and optimizing automated test scripts provided in the embodiments described herein.

Referring now to FIG. 2, additional details will be provided regarding the embodiments presented herein for ranking and optimizing automated test scripts. In particular, FIG. 2 is a flow diagram illustrating the iterative process of scoring and ranking the test scripts in order to optimize their assignment to individual test suites. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 200 begins at operation 202, where, as discussed above, testing personnel 120 execute one or more test suites 112 against the AUT 126 utilizing the automated testing client 124. The automated testing client 124 executes the individual test scripts 114 included in the test suite 112 and records the test result 116 for the script 114 and other execution data 116 in the testing repository 110, as illustrated at operation 204. In one embodiment, the test result 116 for the execution of an individual test script 114 may indicate that the script execution was successful, in other words, the results of each major step in the test script 114 matched the expected results contained in the testing repository 110 for that script. The test result 116 may also indicate that the test script 114 failed due to the detection of a product defect or "bug". This would be the case if the results of each major step in the test script 114 did not match the expected results due to a bug in the AUT 126.

Alternatively, the test result 116 may indicate that the test script 114 produced a "false failure", in other words, the test script 114 failed but the failure was due to a failure of the test script 114 and not due to a product bug. Such a result may be due to timing issues or race conditions created by the speed of execution of the automated test script 114. For example, a test script 114 may be executed by the automated testing client 124 which tests the "Open File" functionality on a "File" dropdown menu in the user interface (UI) of the AUT 126. This test script 114 may include steps for simulating a mouse click on the "File" dropdown menu, and then simulating a mouse click on the "Open . . . " menu item on the dropdown menu. Next, the test script 114 provides a pathname to a test file in the relevant field of the resulting "Open File" dialog box and finally simulates a mouse click of the "Ok" button to open the file.

After executing these operations, the automated testing client 124 verifies the specified file was successfully opened by the AUT 126. However, the test script 114 may fail because the current performance of the testing workstation 122 resulted in the "File" dropdown menu not fully rendering before the simulated click on the "Open . . . " menu item was executed. This type of failure may be due to the speed of execution of consecutive steps of the test script 114 by the automated testing client 124, and such a failure may not have occurred if the UI of the AUT 126 was being utilized by an actual user. In this scenario, the failure is deemed to be a failure of the test script 114 and not a failure of the AUT 126, and therefore not a bug. False failures may also result when external resources required for testing are locked by other test scripts being executed simultaneously, or are unavailable due to a network failure or other external factors.

In one embodiment, the automated testing client 124 is able to determine in most cases whether a failure is due to a product bug or not. However, an execution of a test script 114 may produce a test result 116 of failure requiring an investigation, indicating that the test script 114 failed but the automated testing client 124 was unable to determine whether the failure was due to a product bug or a failure of the test script 114. In these cases, testing personnel 120 may perform a follow-up investigation of the execution of the test script 114 to determine the cause of the failure, which is then recorded in the testing repository 110. This follow-up investigation may be facilitated by the automated testing client 124 and automated testing server 104.

According to further embodiments presented herein, the execution data 116 recorded in the testing repository 110 for each execution of a test script 114, as illustrated in operation 204, includes the time and date the script 114 was executed, how long it took for the script 114 to run, and the number of code blocks or lines of code tested. It will be appreciated that the code blocks or lines of code tested by the execution of the test script 114 can be determined by any number of code coverage techniques know in the art. It will further be appreciated that any number of additional metrics and data regarding the execution of a test script 114 may be recorded in the test repository 110.

From operation 204, the routine 200 proceeds to operation 206, where the scoring routine 106 calculates one or more scores 118 for each test script 114 in the testing repository 110, based upon the test result and execution data 116 contained in the repository 110 for the test script 114. As will become apparent below, the routine 200 is an iterative process that is repeated on a regular basis during the lifecycle of development of the software product being tested. Therefore, there will likely be a number of test results and execution data 116 recorded in the testing repository 110 for each test script 114, spanning a period of time. In one embodiment, the scoring routine 106 calculates a score 118 for each test script 114 that indicates the propensity of the script to result in false failures. The formula for calculating the score 118 is represented as:

$$SCORE_1 = RUN_{P1} * (K_1 * FF_{P1} + K_2 * FF_{P2} + K_3 * INV_{P1})$$

where $SCORE_1$ represents the propensity of a test script 114 to result in false failures; $RUN_{P1}$ represents the number of times the test script 114 has been run over a previous period of time P1, for example the past month; $FF_{P1}$ represents the rate of false failures resulting from the execution of the script 114 over the period P1, in other words the ratio of the number of executions of the test script 114 that resulted in failure not due to product bug to the total number of executions of the test script 114 over the same period P1; $FF_{P2}$ represents the rate of false failures resulting from the execution of the script 114 over a longer period P2, for example the past three months; and $INV_{P1}$ represents the number of failures that were investigated over the period P1, in other words, the number of executions that resulted in a test result of failure requiring investigation, as described above, which was subsequently changed to failure due to product bug or failure not due to product bug after investigation by testing personnel 120. The coefficients $K_1$, $K_2$, and $K_3$ are weighting factors that allow the individual terms described above to be weighted differently in the calculation to further optimize the resulting score 118.

The larger the resulting $SCORE_1$ value, the higher the propensity of the test script 114 to produce false failures, and therefore the less reliable the test script 114. In one embodiment, the coefficients $K_1$ and $K_2$ are set such that those test scripts 114 which have been producing false failures for a longer period of time, for example over the three month period P2, are penalized more than those which have only recently begun to result in false failures. In further embodiments, the coefficient $K_3$ is set to a negative number in order to reflect the lack of investigation of failures as contributing to the unreliability of the test script 114. The summation of the terms is multiplied by the number of times the test script 114 has been run over the period P1, to reflect the fact that the more frequently a test script 114 is executed, the higher the cost of the unreliability of the script. The coefficients $K_1$, $K_2$, and $K_3$ can be adjusted at various times during the lifecycle of development of the software product to reflect the changing priorities in testing. For example, early in the product development when many test scripts result in failure, the investigation rate $INV_{P1}$ may not be a critical success metric, and the coefficient $K_3$ will be made relatively small. Later in the development lifecycle, however, it may be more important to investigate every failure, and the coefficient $K_3$ will be increased accordingly.

According to another embodiment, the scoring routine 106 calculates a score 118 for each test script 114 that indicates the effectiveness of the script 114 in identifying product bugs. The formula for calculating the score 118 is represented as:

$$SCORE_2 = K_4 * TIME_{P3} + K_5 * BUG_{P3} + K_6 * FF_{P3} + K_7 * CODE$$

where $SCORE_2$ indicates the effectiveness of a test script 114 in identifying product bugs; $TIME_{P3}$ represents the average time of execution of the test script 114 over a previous period of time P3, for example the past 6 months; $BUG_{P3}$ represents the number of bugs found over the period P3, in other words the number of executions of the test script 114 that resulted in failure due to product bug; $FF_{P3}$ represents the rate of false failures resulting from the execution of the script 114 over the period P3; and CODE represents the number of unique code blocks or lines of code tested by the test script 114. Just as described above, the coefficients $K_4$, $K_5$, $K_6$, and $K_7$ are weighting factors that allow the individual terms to be weighted differently in the calculation to further optimize the resulting score 118.

In this embodiment, the larger the resulting $SCORE_2$ value, the more effective the test script 114 is in identifying product bugs and the more unique code coverage that is provided. The coefficients $K_4$ and $K_6$ may be set to negative numbers to reflect the impact of long execution times or frequent false failure results on the effectiveness of the test script 114. As above, the coefficients can be adjusted at various times during the lifecycle of development of the software product to reflect the changing priorities in testing. In further embodiments, the score 118 may be calculated using any combination of terms described above, or other terms and metrics collected for the test scripts 114, as would be appreciated by one of ordinary skill in the art.

After the scoring routine calculates the score 118 for each test script 114 at operation 206, the routine 200 proceeds to operation 208, where the ranking server 108 ranks the test scripts based upon the score 118 as indicated by test personnel 120 executing the ranking client 128. In one embodiment, test personnel 120 may utilize the ranking client 128 and ranking server 108 to generate a list of the most unreliable test scripts 114 in order to investigate whether these test scripts 114 should be re-developed or removed from testing. In this case, the test scripts 114 will be ranked in descending order of their score 118 indicating propensity to produce false failures ($SCORE_1$). In a further embodiment, test personnel 120 may wish to generate a list of the least effective test scripts 114 in order to move them to less frequently executed test suites 112. Here the test scripts 114 will be ranked by the ranking server 108 in ascending order of their score 118 indicating effectiveness ($SCORE_2$).

From operation 208, the routine 200 proceeds to operation 210, where testing personnel 120 evaluate the ranked list of test scripts 114. In one embodiment, test personnel may review the test result and execution data 116 along with other test history information for a number of test scripts 114 having the lowest effectiveness scores ($SCORE_2$). Based on this evaluation, the test personnel 120 may decide to move one or more of those test scripts 114 to test suites 112 which are executed less frequently, as depicted in operation 212. This will result in the more effective test scripts 114 being executed more often and the least effective test scripts 114 being executed less often. In alternative embodiments, the test personnel may evaluate the reliability ranking of the test scripts 114 before deciding to move the scripts 114 to less frequently executed test suites; evaluate the propensity to produce false failures ranking of the test scripts in order to determine whether further investigation into the cause of the false failures is necessary; or evaluate the effectiveness ranking of the test scripts to prioritize the execution order of test scripts 114 in test suites 112 in order to ensure the most effective or reliable test scripts 114 are executed first, as would be desirable when a limited test window is available and it is unlikely that all test suites 112 can be executed within the window.

It will be appreciated that many more evaluations can be made from the rankings of the various scores 118 calculated for the test scripts 114 in the testing repository 110. In a further embodiment, the ranking server 108 may evaluate the ranking of the test scripts 114 programmatically, performing a predefined action based upon relative or threshold scores configured by testing personnel 120. For example, the ranking server may be configured to programmatically prioritize the execution order of test scripts 114 within a test suite 112 based upon the ranking of their effectiveness score ($SCORE_2$) 118, or to suspend the execution of test scripts 114 having a propensity for false failures score ($SCORE_1$) 118 exceeding a configured threshold. Testing personnel 120 may adjust the predefined actions and threshold scores utilized by the ranking server 108 according to the overall effectiveness of the testing process or the phase of the software product development lifecycle.

From operation 212, the routine 200 returns to operation 202, where the process is repeated iteratively. The result of the iterative process is that in subsequent iterations, more test results and execution data 116 are available for each test script 114 in the testing repository 110, and therefore the scores 118 calculated for the test scripts 114 using the formulas described above will more accurately reflect the measure of reliability or effectiveness desired. In this way, continued use of the process over the development lifecycle of the software product being tested will result in a more efficient and effective testing process.

Figure 3:
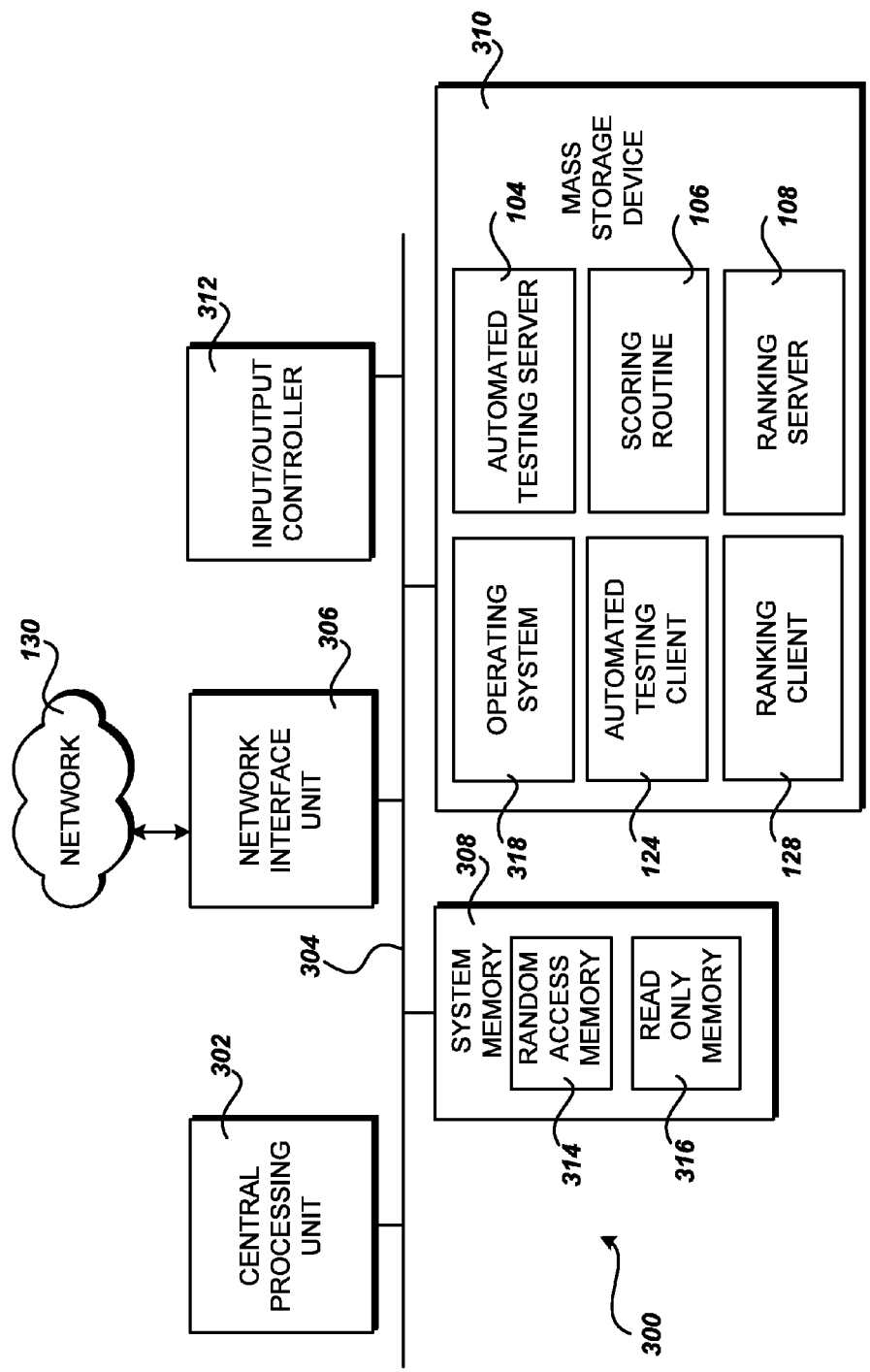
FIG. 3 is a block diagram showing an illustrative computer hardware and software architecture for a computing system capable of implementing aspects of the embodiments presented herein.

FIG. 3 shows an illustrative computer architecture for a computer 300 capable of executing the software components described herein for ranking and optimizing automated test scripts in the manner presented above. The computer architecture shown in FIG. 3 illustrates a conventional desktop, laptop, or server computer and may be utilized to execute any aspects of the software components presented herein described as executing on the development server 102 or testing workstation 122.

The computer architecture shown in FIG. 3 includes a central processing unit 302 ("CPU"), a system memory 308, including a random access memory 314 ("RAM") and a read-only memory ("ROM") 316, and a system bus 304 that couples the memory to the CPU 302. A basic input/output system containing the basic routines that help to transfer information between elements within the computer 300, such as during startup, is stored in the ROM 316. The computer 300 also includes a mass storage device 310 for storing an operating system 318, application programs, and other program modules, which are described in greater detail herein.

The mass storage device 310 is connected to the CPU 302 through a mass storage controller (not shown) connected to the bus 304. The mass storage device 310 and its associated computer-readable media provide non-volatile storage for the computer 300. Although the description of computer-readable media contained herein refers to a mass storage device, such as a hard disk or CD-ROM drive, it should be appreciated by those skilled in the art that computer-readable media can be any available computer storage media that can be accessed by the computer 300.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 300.

According to various embodiments, the computer 300 may operate in a networked environment using logical connections to remote computers through a network such as the network 130. The computer 300 may connect to the network 130 through a network interface unit 306 connected to the bus 304. It should be appreciated that the network interface unit 306 may also be utilized to connect to other types of networks and remote computer systems. The computer 300 may also include an input/output controller 312 for receiving and processing input from a number of other devices, including a keyboard, mouse, or electronic stylus (not shown in FIG. 3). Similarly, an input/output controller may provide output to a display screen, a printer, or other type of output device (also not shown in FIG. 3).

As mentioned briefly above, a number of program modules and data files may be stored in the mass storage device 310 and RAM 314 of the computer 300, including an operating system 318 suitable for controlling the operation of a networked desktop, laptop, or server computer. The mass storage device 310 and RAM 314 may also store one or more program modules. In particular, the mass storage device 310 and the RAM 314 may store the automated testing server 104, automating testing client 124, scoring routine 106, ranking server 108, or ranking client 128 application programs, each of which was described in detail above with respect to FIGS. 1 and 2. The mass storage device 310 and the RAM 314 may also store other types of program modules.

Based on the foregoing, it should be appreciated that technologies for ranking and optimizing test scripts utilized in the automated testing of software products are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for ranking and optimizing automated test scripts, the method comprising:

executing, on one or more computer systems, a plurality of test scripts, wherein the test scripts are members of a collection;

recording, at a server computer, a test result and execution data in a repository for each of the plurality of test scripts executed;

calculating, by the server computer, a score for each of the plurality of test scripts by multiplying a number of executions of the test script within a first period of time by a sum of a plurality of terms comprising a ratio of the number of executions of the test script resulting in a test result of failure not due to product bug to the number of executions of the test script within the first period of time, a ratio of the number of executions of the test script resulting in the test result of failure not due to product bug to the number of executions of the test script within a second period of time, and the number of executions of the test script resulting in a test result of failure due to product bug or failure not due to product bug within the first period of time based upon the test results and execution data recorded in the repository for the test script;

ranking, by the server computer, the plurality of test scripts according to the score calculated for each;

determining the members of the collection based upon the rank of each of the plurality of test scripts; and repeating the method over one or more iterations of testing.

2. The method of claim 1, wherein each of the plurality of terms is multiplied by a weighting factor.

3. The method of claim 2, further comprising adjusting the first time period, the second time period, and the weighting factor of each of the plurality of terms between each iteration to further optimize the test scripts.

4. The method of claim 1, wherein determining the members of the collection comprises removing from the collection the test scripts having a score higher than a threshold score.

5. A computer-implemented method for ranking and optimizing automated test scripts, the method comprising:

executing, on one or more computer systems, a plurality of test scripts, wherein the test scripts are members of a collection;

recording, at a server computer, a test result and execution data in a repository for each of the plurality of test scripts executed;

calculating, by the server computer, a score for each of the plurality of test scripts by adding a plurality of terms comprising an average of an execution time of the test script over a period of time, a number of executions of the test script resulting in a test result of failure due to product bug within the period of time, a ratio of the number of executions of the test script resulting in a test result of failure not due to product bug to the number of executions of the test script within the period of time, and a number of unique lines of code tested by the test script based upon the test results and execution data recorded in the repository for the test script, wherein each of the plurality of terms is multiplied by a weighting factor;

ranking, by the server computer, the plurality of test scripts according to the score calculated for each;

determining the members of the collection based upon the rank of each of the plurality of test scripts; and repeating the method over one or more iterations of testing.

6. The method of claim 5, further comprising adjusting the period of time and the weighting factor of each of the plurality of terms between each iteration to further optimize the test scripts.

7. The method of claim 5, wherein determining the members of the collection comprises removing from the collection the test scripts having a score lower than a threshold score.

8. A computer storage medium that is not a signal, having computer executable instructions stored thereon that, when executed by a computer, cause the computer to:

collect in a repository a test result and execution data for a plurality of executions of each of a plurality of test scripts;

calculate a score for each of the plurality of test scripts by adding a plurality of terms comprising an average of an execution time of the test script over a period of time, a number of executions of the test script resulting in a test result of failure due to product bug within the period of time, a ratio of the number of executions of the test script resulting in a test result of failure not due to product bug to the number of executions of the test script within the period of time, and a number of unique lines of code tested by the test script based upon the test results and execution data;

rank the plurality of test scripts according to the score;

present to a test reviewer a list of the plurality test scripts sorted according to the rank;

receive from the test reviewer a change in frequency of execution for a subset of test scripts in the list; and repeat the collecting, calculating, ranking, presenting, and receiving over one or more iterations of testing.

9. The computer storage medium of claim 8, having further computer executable instructions stored thereon that cause the computer to calculate a second score for each of the plurality of test scripts indicating a propensity of the test script to result in a test result of failure not due to a product defect, and wherein ranking the plurality of test scripts comprises ranking the test scripts in descending order of propensity to result in a test result of failure not due to a product defect.

10. The computer storage medium of claim 8, wherein the score calculated for each of the plurality of test scripts indicates an effectiveness of the test script in finding a product defect, and wherein ranking the plurality of test scripts comprises ranking the test scripts in ascending order of effectiveness in finding a product defect.

11. The computer storage medium of claim 8, wherein the score calculated for each of the plurality of test scripts combines a propensity of the test script to result in a test result of failure not due to a product defect and an effectiveness of the test script in finding a product defect.

* * * * *